(12) United States Patent
Meyer et al.

(10) Patent No.: US 10,113,662 B2
(45) Date of Patent: Oct. 30, 2018

(54) LIQUID DISPENSING FAUCET WITH PULL-TO-OPEN VALVE ELEMENT

(71) Applicant: The Meyer Company, Cleveland, OH (US)

(72) Inventors: Michael H. Meyer, Sagamore Hills, OH (US); Michael A. Kolar, North Royalton, OH (US)

(73) Assignee: The Meyer Company, Cleveland, OH (US)

( * ) Notice: Subject to any disclaimer, the term of this patent is extended or adjusted under 35 U.S.C. 154(b) by 0 days.

(21) Appl. No.: 15/449,829

(22) Filed: Mar. 3, 2017

(65) Prior Publication Data

US 2017/0253472 A1   Sep. 7, 2017

Related U.S. Application Data

(60) Provisional application No. 62/302,806, filed on Mar. 3, 2016.

(51) Int. Cl.

| | |
|---|---|
| *B67D 3/00* | (2006.01) |
| *B67D 7/06* | (2010.01) |
| *F16K 35/02* | (2006.01) |
| *F16K 41/10* | (2006.01) |
| *B67D 1/14* | (2006.01) |
| *B67D 3/04* | (2006.01) |

(52) U.S. Cl.
CPC .......... *F16K 35/027* (2013.01); *B67D 1/1455* (2013.01); *B67D 3/043* (2013.01); *F16K 41/103* (2013.01)

(58) Field of Classification Search
CPC .............................. B67D 1/1455; B67D 3/043

USPC ........................ 222/509, 505, 514, 518, 519; 251/319–323

See application file for complete search history.

(56) References Cited

U.S. PATENT DOCUMENTS

| | | | | |
|---|---|---|---|---|
| 1,723,066 A | * | 8/1929 | Ogden ................... | B67D 3/043 251/215 |
| 1,727,169 A | * | 9/1929 | Hengesbach .......... | B67D 3/043 251/100 |
| 2,066,827 A | * | 1/1937 | De Witt ................. | B67D 3/043 137/588 |
| 2,936,098 A | * | 5/1960 | Narbo .................... | F16K 51/00 222/192 |
| 3,612,354 A | * | 10/1971 | Sitton .................. | B67D 1/1466 137/614.19 |

(Continued)

*Primary Examiner* — Vishal Pancholi
(74) *Attorney, Agent, or Firm* — Fay Sharpe LLP

(57) ABSTRACT

A faucet for dispensing beverages includes a valve element that is selectively moved from its seated position to its unseated position by manual linear movement of a handle in a first direction from a retracted position toward an extended position. Movement of the handle in the first direction induces movement of the valve element in the first direction. A shaft projects through the handle and an outer end of the shaft provides a reaction structure or button that is engaged by a thumb of a user during movement of the handle from its retracted position toward its extended position. When in its extended position, the handle can be rotated to a lock-open position where interference between the handle and the faucet body prevents movement of the handle from its extended position to its retracted position whereby the faucet is maintained in an opened condition for continuous dispensing of liquid.

17 Claims, 3 Drawing Sheets

(56) References Cited

U.S. PATENT DOCUMENTS

| | | | |
|---|---|---|---|
| 3,863,673 A * | 2/1975 | Sitton | B67C 9/00 |
| | | | 137/170.2 |
| 5,449,144 A | 9/1995 | Kowalics | |
| 6,082,598 A * | 7/2000 | Lee | B67D 3/04 |
| | | | 222/153.14 |
| 6,648,186 B2 | 11/2003 | Roethel et al. | |
| 6,868,994 B2 | 3/2005 | Kawolics | |
| 6,908,071 B2 | 6/2005 | Roethel et al. | |
| 7,513,395 B2 | 4/2009 | Labinski et al. | |
| 8,418,991 B2 | 4/2013 | Meyer et al. | |
| 8,418,992 B2 | 4/2013 | Meyer et al. | |
| 2015/0114998 A1 | 4/2015 | Meyer et al. | |
| 2016/0009542 A1 | 1/2016 | Meyer et al. | |

* cited by examiner

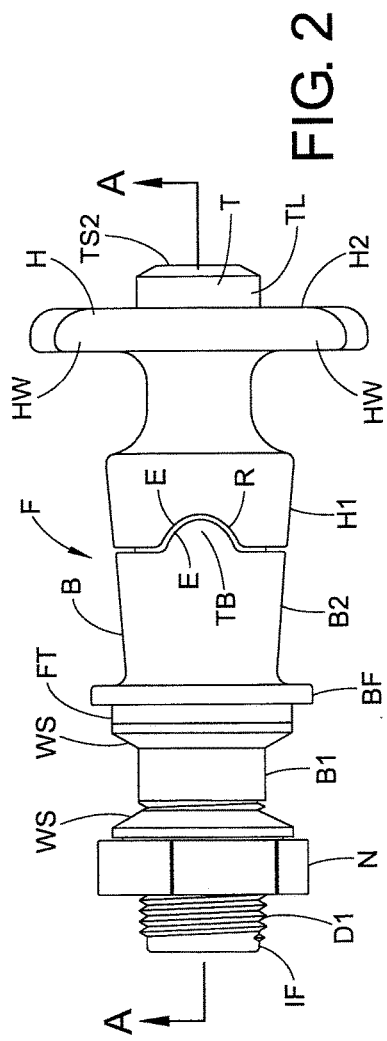
FIG. 2
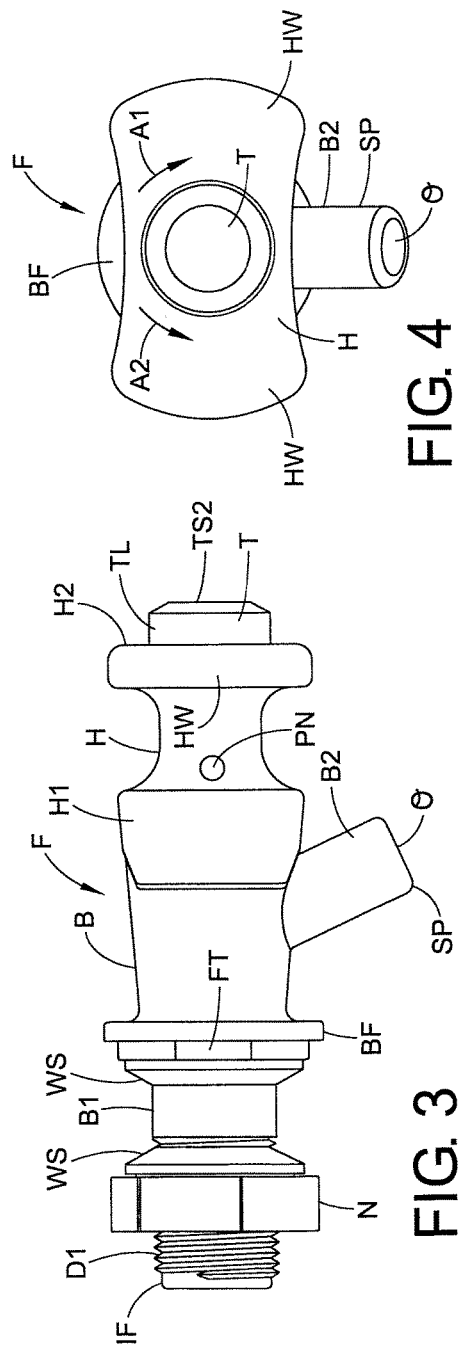
FIG. 3
FIG. 4

LIQUID DISPENSING FAUCET WITH PULL-TO-OPEN VALVE ELEMENT

CROSS-REFERENCE TO RELATED APPLICATION

This application claims priority from and benefit of the filing date of U.S. provisional patent application Ser. No. 62/302,806 filed Mar. 3, 2016, and the entire disclosure of said provisional application is hereby expressly incorporated by reference into the present specification.

BACKGROUND

Faucets for dispensing beverages such as water, coffee, iced tea, or other liquids from an urn, cooler, or other container are well-known and in widespread use. Known faucets for such purposes often require a user to push or pull on a pivoting handle to open the valve of the faucet, and the valve automatically closes due to the presence of a biasing spring. Other faucets of this type include a push-button that is depressed (pushed inwardly) to open the faucet valve, and the faucet includes a biasing spring that closes the valve automatically when the user releases the button.

Known faucets as described above have enjoyed commercial success, but a need has been identified for a new and improved faucet for a cooler or the like that is easy to open with one-hand and that operates similarly to a push-button faucet but that is easier to open, provides improved flow control, can be easier set to a lock-open position where the valve will remain open without continuous manual effort by a user, and that can be easier and quickly closed from its lock-open position, all while providing satisfactory flow volume and shut-off, along with a sanitary design that is resistant to contamination and easy to clean.

SUMMARY

In accordance with one aspect of the present development, a faucet for dispensing liquid includes a body with an inner end adapted to be connected to an associated liquid container and an outer end including a liquid spout for dispensing liquid. The body includes a flow passage that extends from an inlet located in said inner end of said body to an outlet located in said spout. The body further includes a valve chamber therein and defined by part of said flow passage, the valve chamber located between the inlet and the outlet such that the valve chamber separates the flow passage into an inlet portion located between the inlet and the valve chamber and an outlet portion located between the valve chamber and the outlet. The body further includes a valve seat located in the valve chamber and a valve chamber access opening that communicates with the valve chamber. A bonnet is connected to the body and covers the access opening, and the bonnet includes a bonnet aperture therein. A valve assembly controls flow of liquid through the valve chamber, the valve assembly including: (i) a valve element selectively movable between a seated position in which the valve element is engaged with the valve seat to block liquid flow past the valve seat, and an unseated position in which the valve element is disengaged from the valve seat to allow liquid flow past the valve seat; (ii) a valve stem that extends through the bonnet aperture and that comprises an inner end operably connected to the valve element and an outer end located external to the body. A handle is operably connected to the outer end of the valve stem and is movable linearly in a first direction from a retracted position to an extended position. A spring is operably engaged with the valve element and biases the valve element toward its retracted position. A reaction structure is located adjacent the handle and adapted to be engaged by a user during movement of the handle from its retracted position toward its extended position. The valve element is selectively moved from its seated position to its unseated position by manual linear movement of the handle in a first direction from its retracted position toward its extended position, the movement of the handle in the first direction inducing movement of the valve stem and valve element in the first direction.

BRIEF DESCRIPTION OF THE DRAWINGS

FIGS. 2, 3, 4 are respective top, side and front views of the faucet F;

DETAILED DESCRIPTION

Figure 1:
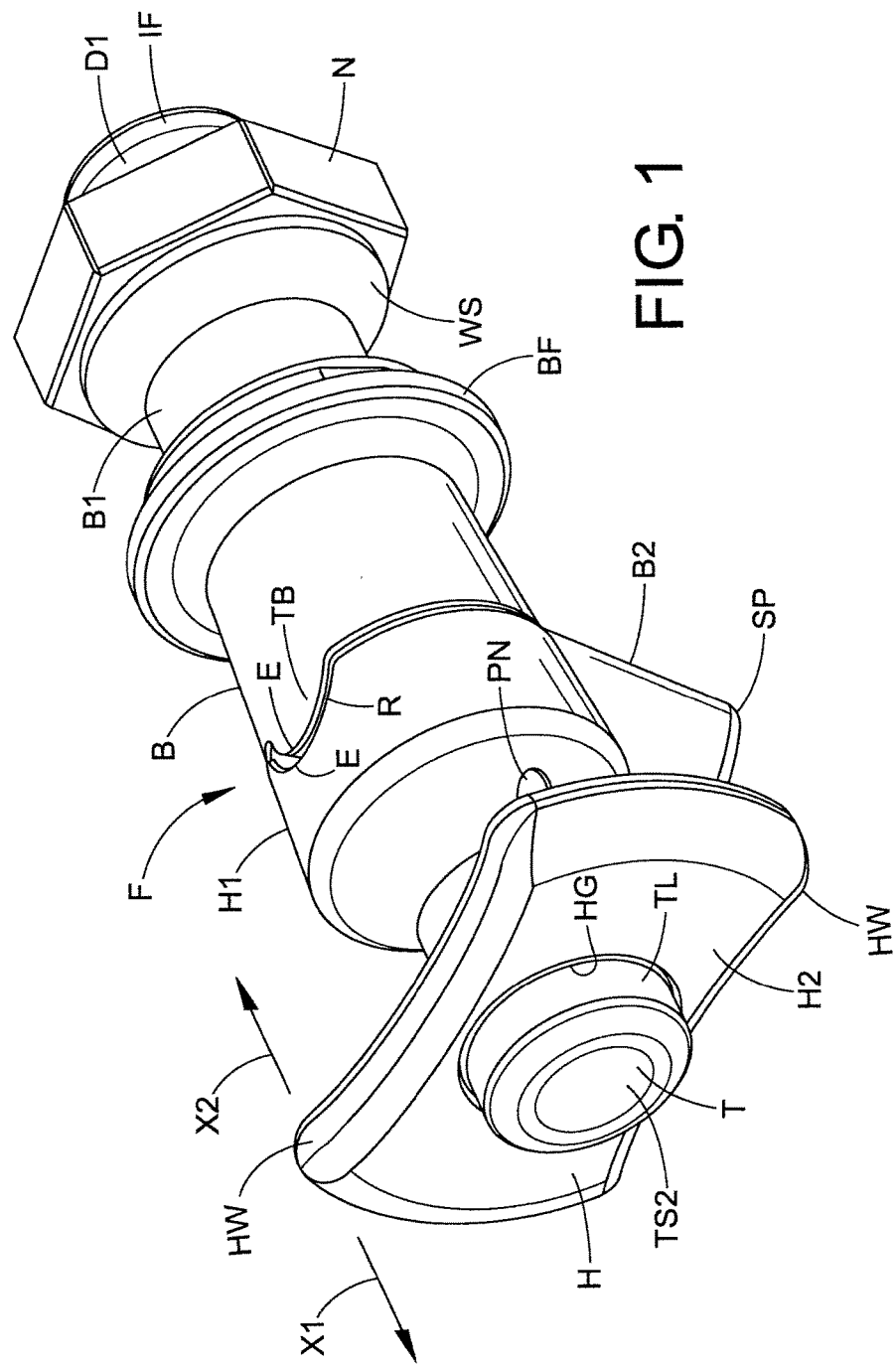
FIG. 1 is a front isometric view of a liquid dispensing faucet F formed in accordance with an embodiment of the present development.
Figure 5:
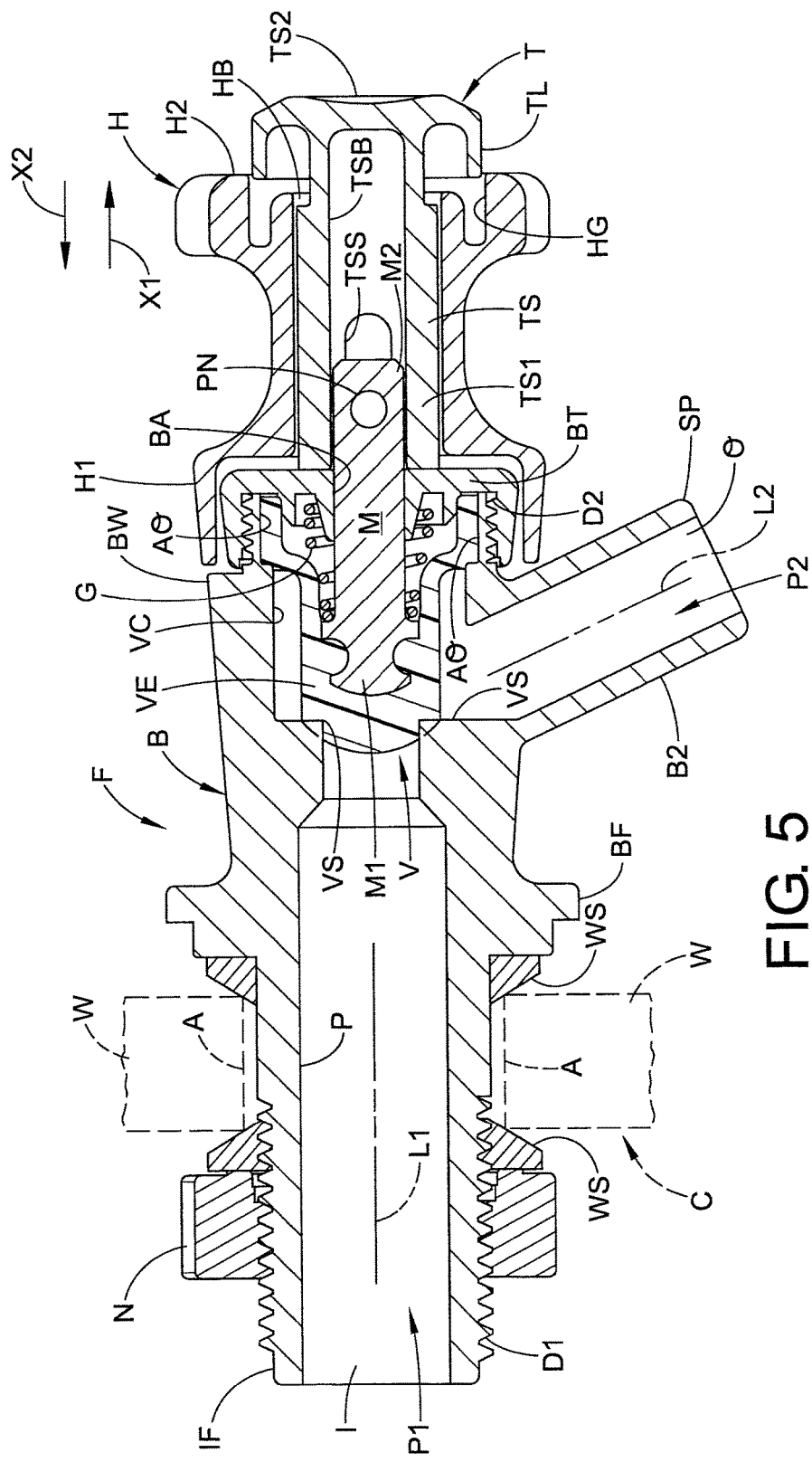
FIG. 5 is a section view of the faucet F taken at view line A-A of FIG. 2.

FIG. 1 is a front isometric view of a liquid dispensing faucet F formed in accordance with an embodiment of the present development. FIGS. 2, 3, 4 are respective top, side and front views of the faucet F. FIG. 5 is a section view of the faucet F taken at view line A-A of FIG. 2.

The faucet F is adapted to be connected to a cooler, urn, or other liquid container in fluid communication with the container liquid reservoir and the faucet F is adapted to be selectively opened for dispensing liquid from the container liquid reservoir into a cup or other receptacle through the faucet. In one embodiment, the faucet F is particularly adapted for dispensing beverages from a cooler, urn, or other container.

The faucet F comprises a body B which, in the illustrated embodiment, is defined from a one-piece molded polymeric construction, but it can alternatively be provided by an assembly of polymeric, metallic and/or other components manufactured and assembled by suitable means. The body B comprises an inner end B1 including an inlet fitting IF adapted for mating and connecting with an associated urn or container, such as a liquid beverage cooler or the like, by insertion of the inlet fitting IF through an aperture A (see particularly FIG. 5) defined in a wall W of the associated container C. In the illustrated embodiment, the inlet fitting IF comprises external threads D1 that are adapted to receive a nut N which, when threaded onto the inlet fitting IF, captures the container wall W between the nut N and a radially enlarged flange BF of the body B. One or more resilient seals such as washers WS seal the interface between the wall W and the inlet fitting IF of the faucet body. In the illustrated embodiment, the body B includes one or more external flats or other non-circular features FT that abut and/or lie closely adjacent corresponding flats or other non-circular features of the container wall W to both ensure that the faucet body B is properly inserted and located in the aperture A and also to prevent unintended rotation of the faucet body B relative to the container wall W during use and when the nut N is tightened on the inlet fitting IF.

Referring again to FIG. 5, the body B includes a flow passage P that extends through the body B from its inner end B1 to a spout SP located at the outer end B2 of the body B for flow of liquid from the reservoir of the container C into a cup or other receptacle positioned beneath or adjacent the spout SP. In particular, an inlet I of the flow passage P opens through the body B at an inner end of the flow passage P through the inlet fitting IF and an outlet O of the flow passage P opens through the body B at an outer end of the flow passage P through the spout SP. The body B further comprises a valve chamber VC defined in the body B as part of said passage P and located between the inlet I and outlet O. The flow passage P is thus separated by the valve chamber VC into an inlet portion P1 located between the inlet I and the valve chamber VC and defined about and extending axially along a first axis L1, and an outlet portion P2 located between the outlet O and the valve chamber VC and defined about and extending axially along a second axis L2 that is transversely oriented relative to the first axis.

Inside the valve chamber VC, the body B defines a valve seat VS. In the illustrated embodiment, the valve seat VS is defined by a circular shoulder of the body centered on the first axis L1 and located where the inlet passage P1 intersects the valve chamber VC.

With continuing reference particularly to FIG. 5, the body B further comprises or defines a valve chamber access opening AO that opens through an external wall BW of the body B and that communicates with the valve chamber VC. As shown herein, the access opening AO is defined coaxially with the first axis L1 of the inlet passage P1 and the valve seat VS. The external wall BW of the body B comprises external threads D2 around the valve chamber access opening AO, and the faucet F further comprises a cover or bonnet BT that is secured to the body via threads D2. The bonnet BT comprises a bonnet aperture BA defined therein.

The faucet F further comprises a valve or valve assembly V that controls the flow of liquid through the valve chamber VC from the inlet passage P1 to the outlet passage P2. The valve assembly V comprises a valve element VE that selectively mates with or engaged the valve seat VS (as shown in FIG. 6) in a seated or first position to block liquid from flowing from the inlet passage P1 past the valve seat VS into and through the valve chamber VC. The valve element VE is selectively movable to a second or unseated position where it is separated, spaced, disengaged, or moved away from the valve seat VS sufficiently to allow liquid flow from the inlet passage P1 past the valve seat VS into the valve chamber VC and through the valve chamber into the outlet passage P2.

The valve assembly V further comprises a valve stem M that extends through the bonnet aperture BA and comprises an inner end M1 operably connected directly or indirectly to the valve element VE and an outer end M2 located external to the body B. As shown herein, the valve stem M is arranged coaxially with respect to the first axis L1.

In the illustrated embodiment, the valve element VE comprises a resilient polymeric or elastomeric element such as a seat cup, but other suitable valve elements can be used without departing from the scope and intent of the present development.

A handle H is operably connected to the outer end M2 of the stem. The handle H is manually movable from its retracted position adjacent the bonnet BT as shown in FIGS. 1-5 to an extended position where the handle H is moved outwardly along the first axis L1 away from the bonnet BT. Because the outer end M2 of the stem M is connected to the handle H, manual movement of the handle H in an outward or opening direction X1 coaxially along the first axis L1 results in or induces corresponding movement of the valve element VE in the first direction X1 away from its seated position to its unseated position to allow liquid flow through the valve chamber VC to the spout SP. As such, the handle H, valve stem M, and valve element VE all move as a unit in the direction X1 along the first axis L1 to open the valve assembly V and allow the flow of liquid through the valve chamber VC.

The valve assembly V further comprises a spring G coaxially positioned around the stem M and operably located between the inner end M1 of the stem M and an inner side or inner face of the bonnet BT that is oriented toward the inside of the valve chamber VC. The spring G is thus operably engaged with the valve element VE through the valve stem M and normally closes the valve assembly V by urging the valve element VE in a second or closing direction X2 (opposite the first or opening direction X1) toward and into its seated position. More particularly, the spring G urges the valve stem M, valve element VE, and handle H to move as a unit in the closing direction X2 along the first axis L1 to close the valve assembly V and block the flow of liquid through the valve chamber VC when the handle H is released not restrained in its extended position. The handle H is conformed and dimensioned to be manually pulled by a user in the first or opening direction X1 in a one-handed manner and includes first and second wings HW that project laterally outward in first and second opposite directions to be engaged by the user's fingers.

The faucet F further comprises a fixed (immovable) button located adjacent the handle H that provides a fixed reaction surface or fixed reaction member or structure to be engaged by a user's thumb or other finger when the user pulls the handle H outwardly in the first direction X1 from its retracted position toward its extended position. In the illustrated embodiment, the handle H comprises a central bore HB coaxially arranged with respect to the first axis L1, and a button T projects outwardly from the handle bore HB and provides a fixed reaction surface or member to be engaged by a user's thumb when the user pulls the handle H outwardly in the first direction X1. In the illustrated embodiment, the button T is provided by the outer exposed face or end TS2 of a rod or shaft TS (FIG. 5) that projects outwardly away from the bonnet BT and that extends through and projects outwardly from the handle bore HB. The handle H thus surrounds the shaft TS and is coaxially positioned about the shaft TS. The handle H comprises an inner end H1 that is located close to or even abutted with an outer surface of the bonnet BT. The handle H also comprises an exposed outer end H2 spaced from the inner end H1. An inner end TS1 of the shaft TS is also abutted with an outer face or surface of the bonnet BT. The shaft TS includes a central shaft bore TSB which is closed at the outer end in the illustrated embodiment by the outer face TS2 of the shaft TS that defines the button T. The valve stem M is coaxially aligned with the shaft bore TSB and the outer end M2 of the valve stem M is located in the shaft bore TSB. The valve stem M is movable in the shaft bore TSB in the first and second directions M1,M2. The shaft TS also includes first and second diametrically opposed, aligned, elongated slots TSS (only one shown) located on opposite sides thereof and that open into the shaft bore TSB. The slots are elongated along or in the direction of the first axis L1. A pin PN is installed such that it extends through the handle H, through the slots TSS and bore TSB of the shaft TS, and through the outer end M2 of the valve stem M. The pin PN thus secures or captures the handle H and shaft TS adjacent the bonnet BT, and connects the outer end M2 of the stem M to the handle H for sliding movement with the handle in the first and second opposite directions X1,X2. Movement of the pin PN with the handle H relative to the shaft TS in the first and second directions X1,X2 correspondingly moves the valve stem M in the shaft bore TSB along the first axis L1, and such movement of the handle H and valve stem M is limited by the length of the slots TSS because the movement of the pin PN is limited by the length of the slots TSS.

The button T is radially enlarged so that it overhangs the outer, exposed end H2 of the handle H. The peripheral edge of the button T comprises a lip TL that is aligned with a mating annular groove HG defined in the outer end H2 of the handle such that the handle H is movable relative to the shaft TS in the first direction X1 and the lip TL is received into the handle groove HG. Contact between the outer end H2 of the handle H and the button T or other part of the shaft TS and/or contact between the pin PN and the outer end of the slots TSS limits further outward movement of the handle H in the first direction X1 relative to the shaft TS.

In one example of use, to dispense a beverage or other liquid, a user will engage the button T with a thumb to restrain the shaft TS in abutment with the bonnet BT by an inwardly oriented force exerted on the button in the direction X2, while at the same time and typically with the same hand, the user will place an index finger and a middle finger (or any other two fingers) on opposite sides of the button T, with each of the fingers located behind a respective one of the wings HW. The user then users the fingers to pull on and move the handle H in the direction X1 relative to the shaft TS to or toward an extended position where at least part of the handle H is moved or spaced away from the bonnet BT and moved away from the valve seat VS so that the valve stem M, which is secured to the handle H via pin PN, is correspondingly moved in the first direction X1 away from the valve seat VS, thus unseating the valve element VE and moving it from is first or seated position to its second or unseated position to allow liquid to flow from the inlet passage P1 past the valve seat VS and through the valve chamber VC to the outlet passage P2, where the liquid is dispensed through the outlet O of the spout SP into an associated container. Liquid in the valve chamber VC is prevented from leaking through the access opening AO and/or through the bonnet aperture BA due to the fact that the valve element VE is sealed against the inside diameter of the access opening AO and preferably also against the inner surface of the bonnet BT. When the user releases the handle H from its extended position, the spring G automatically moves the valve stem M and valve element VE in the second direction X2 so that the handle H also moves in the second direction X2 and returns to its retracted position as shown in the drawings and so that the valve element VE returns to its first or seated position where it engages the valve seat VS to block fluid flow from the inlet passage P1 into the valve chamber VC and outlet passage P2. Inward movement of the handle H in the second direction is limited by engagement of the pin PN with the closed inner walls of the elongated slots TSS, and/or by engagement of the valve element VE with the valve seat, and/or by abutment of the handle H with the bonnet BT.

In the illustrated embodiment, the faucet F is constructed with an optional lock-open feature that can be seen with reference to FIGS. 1-3. The handle H and body B are constructed with respective corresponding or mating features or structures that, when aligned, are able to mate and allow the handle H to move fully to its retracted position for seating the valve element VE, but that block or interfere with movement the handle H from its extended position to its retracted position in the second direction X2 if the features are misaligned for mating. In the illustrated example, the body comprises a projecting tab or other projecting structure or feature TB, and the handle comprises a mating recess or other space R into which the tab TB is received and mated when the tab TB and recess R are angularly aligned with each other as shown herein. The handle H can be selectively manually rotated about the shaft TS (about the first axis L1 in the present example) in at least one or both of first and second angular directions A1,A2 (see FIG. 4) from the illustrated home or unlocked angular position to an angular lock-open position where the tab TB and recess R are not aligned and cannot be mated, in which case the tab TB blocks movement of the handle H under the force of the spring G or otherwise in the second direction X2 from its extended position to its retracted position and the valve element VE will remain in its unseated position, spaced from the valve seat VS, even when the user releases the handle H. The tab TB and recess R are preferably shaped with corresponding curved, tapered or other surfaces or edges E that slide relative to each other when abutted and that cause the handle H to be rotated in either the first or second angular direction A1,A2 as the spring G urges the handle inward in the second direction X2 to bring the tab TB into alignment with the recess R upon movement of the handle H in the second direction X2 in cases where the tab TB and recess R are only slightly misaligned due to inadvertent or incidental angular movement of the handle in either direction A1,A2, which incidental angular movement is not intended to rotate the handle H to its lock-open position when the handle is extended. In one non-limiting example, if the handle is rotated 30 degrees or less in either direction A1,A2, the tab TB and recess R will self-align upon movement of the handle H in the second direction X2 under closing force of the spring G.

Modifications and alterations will occur to those of ordinary skill in the art to which the invention pertains upon reading and understanding this specification. It is intended that the present invention be construed as encompassing all such modifications and alterations to the maximum possible consistent with maintaining the validity of the present invention.

The invention claimed is:

1. A faucet for dispensing liquid, said faucet comprising:
a body including an inner end adapted to be connected to an associated liquid container and including an outer end comprising a liquid spout for dispensing liquid, said body including a flow passage that extends from an inlet located in said inner end of said body to an outlet located in said spout;
said body comprising a valve chamber therein and defined by part of said flow passage, said valve chamber located between said inlet and said outlet such that said valve chamber separates said flow passage into an inlet portion located between said inlet and said valve chamber and an outlet portion located between said valve chamber and said outlet;
said body further comprising a valve seat located in said valve chamber and a valve chamber access opening that communicates with the valve chamber;
a bonnet connected to the body and covering the access opening, said bonnet comprising a bonnet aperture therein;
a valve assembly that controls flow of liquid through the valve chamber, said valve assembly comprising: (i) a valve element selectively movable between a seated position in which the valve element is engaged with the valve seat to block liquid flow past the valve seat, and an unseated position in which the valve element is disengaged from the valve seat to allow liquid flow past the valve seat; (ii) a valve stem that extends through the bonnet aperture and that comprises an inner end operably connected to the valve element and an outer end located external to the body;
a handle operably connected to the outer end of the valve stem, said handle movable linearly in a first direction from a retracted position to an extended position;
a spring operably engaged with the valve element and biasing the valve element toward its seated position;
a reaction structure located adjacent the handle and adapted to be engaged by a user during movement of the handle from its retracted position toward its extended position, wherein said reaction structure comprises an exposed end of a shaft that projects outwardly from said bonnet;
wherein said valve element is selectively moved from its seated position to its unseated position by manual linear movement of the handle in a first direction from its retracted position toward its extended position, said movement of said handle in said first direction inducing movement of the valve stem and valve element in the first direction; and
wherein said handle comprises a handle bore and said shaft extends through said handle bore such that said exposed end of said shaft defines a button that extends outwardly from the handle bore.

2. The faucet as set forth in claim 1, wherein said inlet portion of said flow passage extends along a first axis and said outlet portion extends along a second axis that is transversely oriented with respect to the first axis, and wherein said handle moves linearly along the first axis.

3. The faucet as set forth in claim 2, wherein said valve seat is defined by a circular portion of said body that is centered on said first axis, and wherein said valve stem is arranged coaxially with said first axis.

4. The faucet as set forth in claim 3, wherein said handle, valve stem, and valve element move together linearly along said first axis when said handle is moved from its retracted position toward its extended position.

5. The faucet as set forth in claim 1, wherein said handle comprises first and second wings that project laterally outward in first and second opposite directions and that are adapted to be engaged by a user's fingers.

6. The faucet as set forth in claim 1, wherein said button is radially enlarged such that it overhangs part of the handle such that said button limits movement of the handle in the first direction when said handle contacts said button.

7. The faucet as set forth in claim 1, wherein said handle, when in its extended position, is selectively rotatable relative to the body from a home position to a lock-open position in which interference between said handle and said body blocks movement of the handle from its extended position to its retracted position.

8. The faucet as set forth in claim 7, wherein said body and handle comprise respective structural features that are aligned when the handle is in its home position and that are misaligned when the handle is in its lock-open position.

9. The faucet as set forth in claim 1, wherein the shaft comprises a bore in which the outer end of the valve stem is located.

10. The faucet as set forth in claim 9, wherein the shaft comprises first and second diametrically opposed, aligned, elongated slots located on opposite sides thereof and that open into the bore of the shaft, and wherein said handle is connected to the outer end of the valve stem by a pin that is engaged with the handle and that extends through the elongated slots and through the outer end of the valve stem.

11. A faucet for dispensing liquid, said faucet comprising:
a body including an inner end adapted to be connected to an associated liquid container and including an outer end comprising a liquid spout for dispensing liquid, said body including a flow passage that extends from an inlet located in said inner end of said body to an outlet located in said spout;
said body comprising a valve chamber therein and defined by part of said flow passage, said valve chamber located between said inlet and said outlet such that said valve chamber separates said flow passage into an inlet portion located between said inlet and said valve chamber and an outlet portion located between said valve chamber and said outlet;
said body further comprising a valve seat located in said valve chamber and a valve chamber access opening that communicates with the valve chamber;
a bonnet connected to the body and covering the access opening, said bonnet comprising a bonnet aperture therein;
a valve assembly that controls flow of liquid through the valve chamber, said valve assembly comprising: (i) a valve element selectively movable between a seated position in which the valve element is engaged with the valve seat to block liquid flow past the valve seat, and an unseated position in which the valve element is disengaged from the valve seat to allow liquid flow past the valve seat; (ii) a valve stem that extends through the bonnet aperture and that comprises an inner end operably connected to the valve element and an outer end located external to the body;
a handle operably connected to the outer end of the valve stem and movable in a first direction from a retracted position to an extended position;
a spring operably engaged with the valve element and biasing the valve element toward its seated position;
a reaction structure located adjacent the handle and adapted to be engaged by a user during movement of the handle from its retracted position toward its extended position, wherein said reaction structure comprises an exposed end of a shaft that projects outwardly away from said bonnet;
wherein said valve element is selectively moved from its seated position to its unseated position by manual movement of the handle in a first direction from its retracted position toward its extended position, said movement of said handle in said first direction inducing movement of the valve stem and valve element in the first direction; and,
wherein said handle comprises a handle bore and said shaft extends through said handle bore such that said exposed end of said shaft extends outwardly from the handle bore.

12. The faucet as set forth in claim 11, wherein said handle comprises first and second wings that project laterally outward in first and second opposite directions and that are adapted to be engaged by a user's fingers.

13. The faucet as set forth in claim 11, wherein the exposed end of the shaft is radially enlarged such that it overhangs part of the handle such that said exposed end of the shaft limits movement of the handle in the first direction when said handle contacts said exposed end of the shaft.

14. The faucet as set forth in claim 11, wherein said handle, when in its extended position, is selectively rotatable relative to the body from a home position to a lock-open position in which interference between said handle and said body blocks movement of the handle from its extended position to its retracted position.

15. The faucet as set forth in claim 14, wherein said body and handle comprise respective structural features that are aligned when the handle is in its home position and that are misaligned when the handle is in its lock-open position.

16. The faucet as set forth in claim 11, wherein the shaft comprises a bore in which the outer end of the valve stem is located.

17. The faucet as set forth in claim 16, wherein the shaft comprises first and second diametrically opposed, aligned, elongated slots located on opposite sides thereof and that open into the bore of the shaft, and wherein said handle is connected to the outer end of the valve stem by a pin that is engaged with the handle and that extends through the elongated slots and through the outer end of the valve stem.

* * * * *